United States Patent [19]

Seidner et al.

[11] Patent Number: 5,812,236
[45] Date of Patent: Sep. 22, 1998

[54] MULTIFOCAL CORNEAL CONTACT LENS PAIR

[75] Inventors: Leonard Seidner, Morganville, N.J.; Maurice Poster, Jericho, N.Y.

[73] Assignee: Permeable Technologies, Inc., Morganville, N.J.

[21] Appl. No.: 751,220

[22] Filed: Nov. 15, 1996

[51] Int. Cl.[6] ................................................. G02C 7/04
[52] U.S. Cl. ........................................................ 351/161
[58] Field of Search ........................................... 351/161

[56] References Cited

U.S. PATENT DOCUMENTS

| | | | |
|---|---|---|---|
| 3,482,906 | 12/1969 | Volk | 351/160 |
| 3,950,082 | 4/1976 | Volk | 351/161 |
| 4,418,991 | 12/1983 | Breger | 351/161 |
| 4,525,043 | 6/1985 | Bronstein | 351/161 |
| 4,580,882 | 4/1986 | Nuchman et al. | 351/161 |
| 4,636,049 | 1/1987 | Blaker | 351/161 |
| 4,640,595 | 2/1987 | Volk | 351/161 |
| 4,752,123 | 6/1988 | Blaker | 351/161 |
| 4,765,728 | 8/1988 | Porat et al. | 351/161 |
| 4,883,350 | 11/1989 | Muckenhirn | 351/160 R |
| 4,890,912 | 1/1990 | Visser | 351/161 |
| 4,936,672 | 6/1990 | Capez | 351/161 |
| 4,971,432 | 11/1990 | Koeniger | 351/161 |
| 5,002,382 | 3/1991 | Seidner | 351/161 |
| 5,024,517 | 6/1991 | Seidner | 351/161 |
| 5,046,836 | 9/1991 | Volk . | |
| 5,089,024 | 2/1992 | Christie et al. | 351/161 |
| 5,112,351 | 5/1992 | Christie et al. | 351/161 |
| 5,125,729 | 6/1992 | Mercure | 351/161 |
| 5,158,572 | 10/1992 | Nielsen | 351/161 |
| 5,181,053 | 1/1993 | Brown | 351/161 |
| 5,200,773 | 4/1993 | Volk | 351/160 R |
| 5,229,797 | 7/1993 | Futhey et al. | 351/161 |
| 5,365,701 | 11/1994 | Brown | 451/28 |
| 5,404,183 | 4/1995 | Seidner | 351/161 |
| 5,485,228 | 1/1996 | Roffman et al. | 351/161 |
| 5,493,350 | 2/1996 | Seidner | 351/161 |
| 5,526,071 | 6/1996 | Seidner et al. | 351/161 |

FOREIGN PATENT DOCUMENTS

WO8902251  3/1989  WIPO .................................. 351/161

*Primary Examiner*—Frank G. Font
*Assistant Examiner*—Jason D. Vierra-Eisenberg
*Attorney, Agent, or Firm*—R. Neil Sudol; Henry D. Coleman

[57] ABSTRACT

A pair of multifocal contact lenses customized for a patient. A first corneal contact lens and a second corneal contact lens each have an anterior side with a power curve defined in part by (i) a central surface, (ii) an inner annular surface contiguous with the central surface, (iii) a second annular surface contiguous along a radially inner periphery with the inner annular surface, and, optionally, (iv) an outer annular surface contiguous along a radially inner periphery with the second annular surface. Each of the annular surfaces is concentric or coaxial with the central surface. The central surface corresponds to a distance vision correction zone, the second annular surface to a near vision correction zone, and the outer annular surface to a distant vision correction zone. The inner annular surface of the first corneal contact lens corresponds to a long intermediate vision correction zone, while the inner annular surface of the second corneal contact lens corresponds to a short intermediate vision correction zone. To that end, the inner annular surface of the first corneal contact lens and the inner annular surface of the second corneal contact lens have substantially different optical powers.

20 Claims, 3 Drawing Sheets

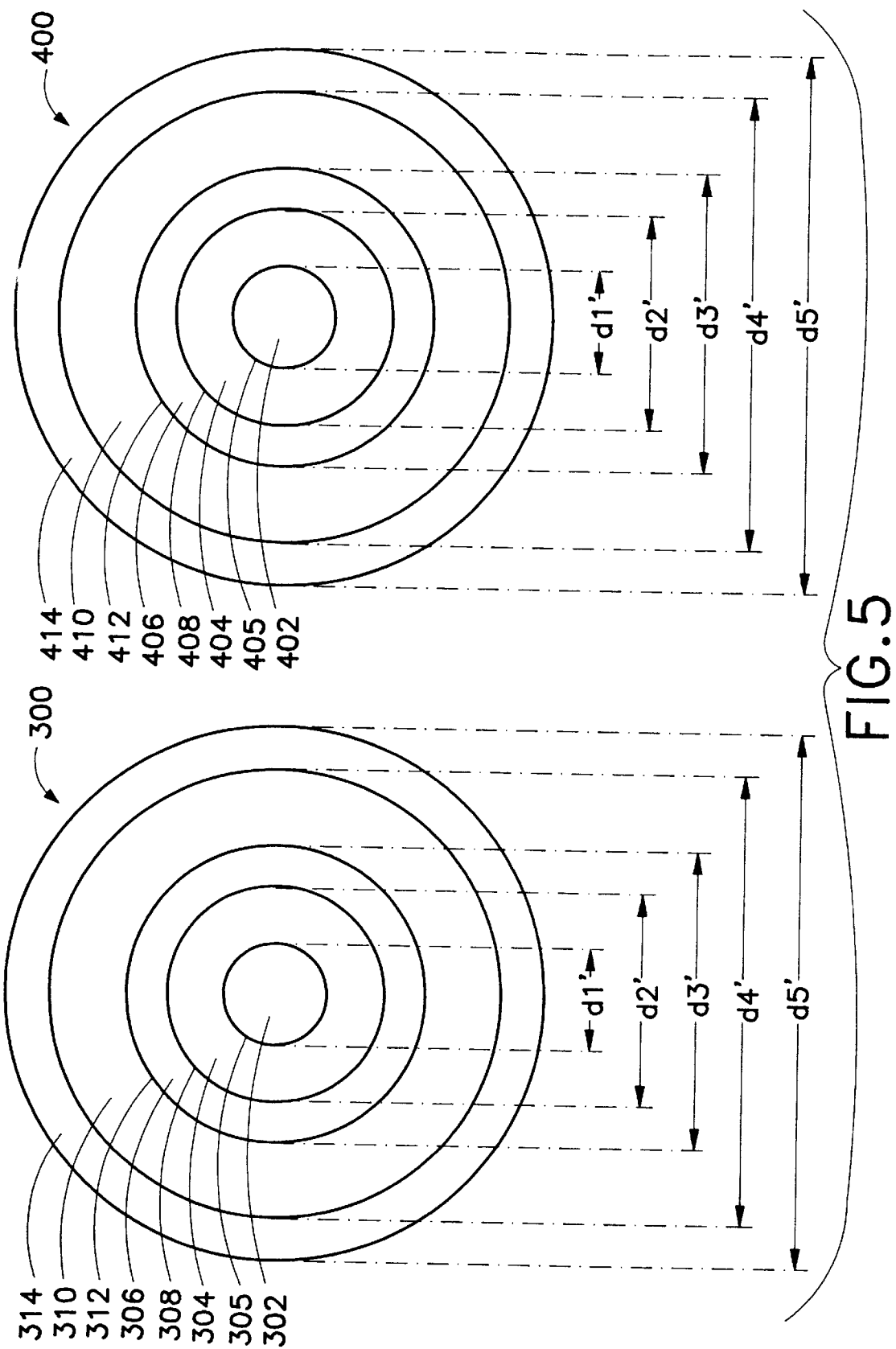

MULTIFOCAL CORNEAL CONTACT LENS PAIR

BACKGROUND OF THE INVENTION

This invention relates to multifocal contact lenses. More particularly, this invention relates to a multifocal contact lens pair.

Bifocal contact lenses are designed to correct or compensate for a condition of advancing age known as "presbyopia." In a presbyopic eye, the ability to focus at near distances, such as the normal reading distance, and in some cases at intermediate distances, is diminished. The loss of focusing capability is due to hardening of the eye's natural crystalline lens material.

Generally, multifocal contact lenses (usually either bifocal, trifocal or aspheric) are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented or translating type, the lens is divided into two somewhat D-shaped zones. Usually the upper area is for distance vision correction, whereas the lower area is for near vision correction. Such conventional segmented contact lenses require some sort of movement of the lens relative to the eye to achieve acceptable visual acuity for both distant and near vision.

It has been discovered that as a presbyopic patient ages, there is generally little change in the prescription for the patient's distance vision (in healthy eyes). However, the near vision prescription requires continual correction. At some point in monovision corrective lenses, when the near vision prescription strength is increased beyond a certain level, it appears that the distance vision of the patient suffers.

OBJECTS OF THE INVENTION

An object of the present invention is to provide a pair of multifocal contact lenses.

Another object of the present is to provide such contact lenses which facilitate vision for emerging and advanced presbyopes.

A further, more particular, object of the present is to provide such contact lenses which do not decrease distance vision where the patient has a substantial correction for near vision.

These and other objects of the present invention will be evident from the drawings and detailed descriptions set forth herein.

BRIEF DESCRIPTION

A pair of multifocal contact lenses customized for a patient comprises, in accordance with the present invention, a first corneal contact lens and a second corneal contact lens each having an anterior side with a power curve defined in part by (i) a central surface, (ii) an inner annular surface contiguous with the central surface, (iii) a second annular surface contiguous along a radially inner periphery with the inner annular surface, and, optionally, (iv) an outer annular surface contiguous along a radially inner periphery with the second annular surface. Each of the annular surfaces is concentric or coaxial with the central surface. The central surface corresponds to a distance vision correction zone, the second annular surface to a near vision correction zone, and the outer annular surface to a distant vision correction zone. The inner annular surface of the first corneal contact lens corresponds to a long intermediate vision correction zone, while the inner annular surface of the second corneal contact lens corresponds to a short intermediate vision correction zone. To that end, the inner annular surface of the first corneal contact lens and the inner annular surface of the second corneal contact lens have substantially different optical powers.

The inner annular surface of the first corneal contact lens is designed to provide a vision correction in a television viewing range, whereas the inner annular surface of the second corneal contact lens provides a vision correction in a computer screen viewing range. Accordingly, the inner annular surface of the first corneal contact lens provides an optimal vision correction for objects disposed at a distance from the patient between approximately 6 feet and approximately 12 feet, and the inner annular surface of the second corneal contact lens provides an optimal vision correction for objects disposed at a distance from the patient between approximately 2 feet and approximately 5 feet.

A pair of contact lenses in accordance with the present invention provides a kind of modified monovision wherein essentially perfect distance viewing is available for both eyes. Reading vision is also good. The intermediate viewing range is divided into a long zone and a short zone each of which is in focus for one eye only.

Each vision-correcting or power surface in a pair of contact lenses in accordance with the present invention has a respective uniform standard eccentricity. The eccentricity may be zero for each power surface. This means that all of the power surfaces are spherical. Alternatively, one or more of the surfaces may be clearly aspherical, with a uniform standard eccentricity substantially or markedly different from zero (e.g., with a magnitude greater than approximately 0.6).

It is generally contemplated that the first corneal contact lens, with the long intermediate vision correction zone, will be provided for the dominant eye of the patient, while the second corneal contact lens, with the short intermediate vision correction zone, will be provided for the non-dominant eye of the patient.

The optical powers of the inner annular surfaces of the two paired contact lenses differ in magnitude by more than approximately 0.5 diopters.

The present invention may be used with all standard contact lens materials, i.e., rigid (gas permeable or PMMA), but is preferably used with soft (hydrogel) polymeric materials i.e., polymeric materials which contain at least about 10% by weight water after hydration, such as disclosed in U.S. Pat. Nos. 5,314,960 and 5,314,961.

BRIEF DESCRIPTION OF THE DRAWING

FIG. 5 is a schematic front elevational view, on an enlarged scale, of a pair of multifocal contact lenses in accordance with the present invention.

DESCRIPTION OF THE PREFERRED EMBODIMENTS

Figure 1:
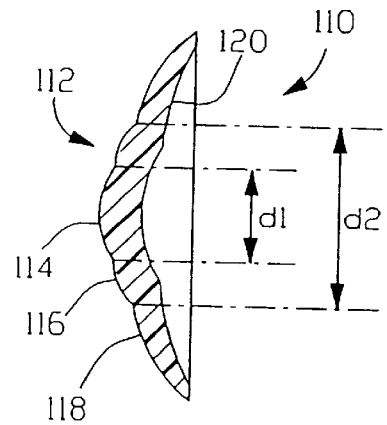
FIG. 1 is a schematic cross-sectional view of a multifocal contact lens.

Generally, as illustrated in FIG. 1, a multifocal contact lens 110 has an anterior side 112 with a power curve defined in part by a central aspheric surface 114 and at least one annular aspheric surface 116 concentric or coaxial therewith. Where central aspheric surface 114 corresponds to a distance vision correction zone, it will have a standard eccentricity value between about −0.6 and about −1.2 and, more preferably, between about −0.75 and about −0.85. In lens 110, annular aspheric surface 116 corresponds to a progressive-add correction zone and has a standard eccentricity value between about −1.35 and about −2.5. The negative eccentricities mean that the deviations from spheric result in a radius of curvature which is smaller than, or reduced with respect to, a spheric radius. Conversely, where eccentricities are positive, the deviations from spheric result in a radius of curvature which is greater than, or increased with respect to, a spheric radius. Negative eccentricities thus correspond to a steepening of the power curve while positive eccentricities correspond to a flattening of the power curve.

As further illustrated in FIG. 1, anterior side 112 of lens 110 also has an annular outer area 118 with a spheric power surface providing an additional correction for distance vision. The power curve for outer area 118 is determined during the same over-refraction procedure used to determine the power curve for central aspheric surface 114.

Patient-customized lens 110 has a cornea-fitting posterior surface 120 which is either spheric or aspheric with an eccentricity value ranging from 0.0 to about 1.5. This posterior surface 120 may have essentially the same form or profile as the posterior surface of a diagnostic lens (not shown) used to determine the power curves for surfaces 114, 116, and 118.

Preferably, central aspheric surface 114 has a diameter d1 between approximately 1.6 mm and approximately 2.3 mm, while annular aspheric surface 116 has a diameter d2 between approximately 2.9 mm and 3.6 mm. For example, central aspheric surface 114 may have a standard diameter of approximately 2.2 mm, while annular aspheric surface 116 has a standard diameter of approximately 3.0 mm or 3.5 mm. In some cases, the diameter of central aspheric surface 114 will be reduced to approximately 1.9 mm, for purposes of providing adequate vision enhancement.

Lens 110 may be manufactured from a hydrophilic polymer such as those disclosed in U.S. Pat. Nos. 5,314,960 and 5,314,961, the disclosures of which are hereby incorporated by reference.

In some cases, depending on the patient's reaction to an over-refraction diagnostic procedure, central aspheric surface 114 of customized multifocal contact lens 110 corresponds to a near vision correction zone and has a standard eccentricity value between about 1.35 and about 2.5. Concomitantly, annular aspheric surface 116 corresponds to a distance vision correction zone having a standard eccentricity value between about 0.6 and about 1.2 and, preferably, between about 0.8 and about 0.9. In this embodiment also, annular outer area 112 is provided with a spheric power surface providing a distance vision correction.

It is to be noted that one eye of a patient may be provided with a lens 110 where central aspheric surface 114 is a distance vision correction zone, while the other eye of the patient is provided with a lens 110 where central aspheric surface 114 is a near vision correction zone. This is a kind of modified monovision, based on the same principles as those underlying the contact lens combinations disclosed in U.S. Pat. Nos. 5,002,382 or 5,024,517. Alternatively, where the central aspheric surfaces 114 of both contact lenses 110 correct distance vision and have standard eccentricity values between about −0.6 and about −1.2 and the annular aspheric surfaces correspond to progressive-add-type correction zones with standard eccentricity values between about −1.35 and about −2.5, the central aspheric surface of the lens for a dominant eye of the patient is larger in diameter than the central aspheric surface of the lens for a nondominant eye of the patient. In this case, the diameter of annular aspheric surface 114 of the dominant lens is substantially equal to the diameter of the annular aspheric surface of the nondominant lens. Specifically, the diameter of the central aspheric surface of the dominant lens is about 2.2 mm and the diameter of the central aspheric surface of the nondominant lens is about 1.9 mm, while the diameter of the annular aspheric surface of either lens is between about 3.0 mm and about 3.5 mm.

Figure 2:
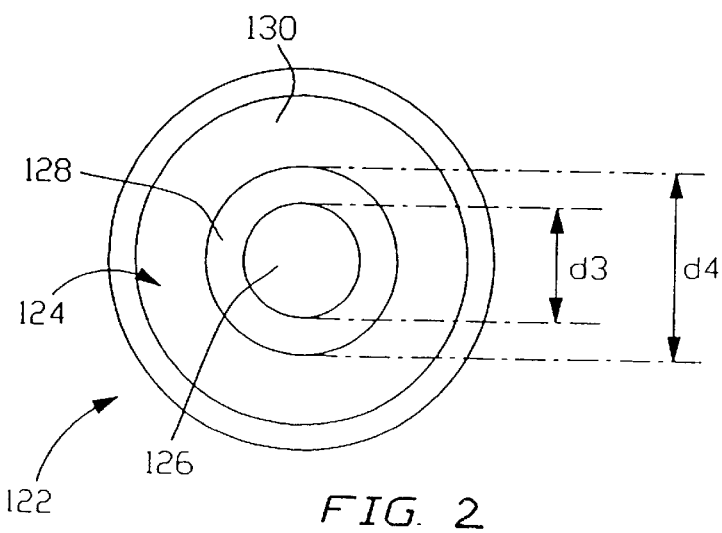
FIG. 2 is a schematic front elevational view, on an enlarged scale, of another multifocal contact lens.

As illustrated in FIG. 2, another customized multifocal contact lens 122 has an anterior side 124 with a power curve defined in part by a central aspheric surface 126 and two annular aspheric surfaces 128 and 130 concentric or coaxial therewith. Central aspheric surface 126 corresponds to an intermediate vision correction zone and has a standard eccentricity value between about 1.2 and about 1.7, while annular aspheric surface 128 corresponds to a distance vision correction zone with a standard eccentricity value between about 0.6 and about 1.2. Annular aspheric surface or outer area 130 corresponds to a near vision correction zone with a spheric power curve. Central aspheric surface 126 has a diameter d3 between approximately 1.5 mm and 2.0 mm, while annular aspheric surface 128 has a diameter d4 between approximately 3.0 mm and 3.7 mm. Again, lens 122 has a posterior profile or surface (not shown) which is the same as that of a diagnostic lens selected for determination of the powers of aspheric surfaces 126, 128, 130 during a diagnostic procedure. The eccentricities of the posterior surface and surfaces 126, 128, and 130 are standard values selectable from a plurality of predetermined eccentricities. The eccentricities are uniform throughout each power surface. Lens 122 is particularly well suited for mature presbyopes, in order to accommodate near, intermediate and distance vision.

To provide adequate vision correction without confusing visual perception of the patient, the maximum change in refractive power in a radially outward direction across any single distance vision correction zone (plan view) 114, 116, 118 (FIG. 1) or 128 (FIG. 2) should be no greater than approximately one diopter or, more preferably, one-half diopter. Thus, the change in refractive power from the center of a "center distance" lens 110 to the boundary between central distant-vision correction zone 114 and annular near vision correction zone 116 should be no greater than approximately one diopter or, more preferably, one-half diopter. Similarly, the change in refractive power across the width of annular distance vision correction zone 116 of a "center near" lens generally should be no greater than approximately 1 diopter or, more preferably, one-half diopter. In addition, the change in eccentricity from one correction zone to the next should be gradual, to reduce stress on the eye. Thus, in certain instances two aspheric curves may suffice to provide adequate multifocal vision and in other instances, one or more additional aspheric surfaces of varying eccentricity will be used to provide the gradual change between zones to accommodate the patient's vision.

In order to secure acceptable distance vision and near vision in a multi-focal contact lens, particularly where there is a significant difference in "add" between the prescription or power curve for distance vision and the prescription or power curve for near vision, the lens may be formed to float or translate slightly on the cornea to an extent greater than normal. Thus, in the case of a contact lens having two anterior aspheric surfaces, a steeper part of the power curve may be shifted over the pupil for near vision. In the case of a lens with a third, paracentral anterior aspheric surface, the slight translation of the lens may serve to shift the lenticular area more squarely over the pupil for near vision.

Figure 3:
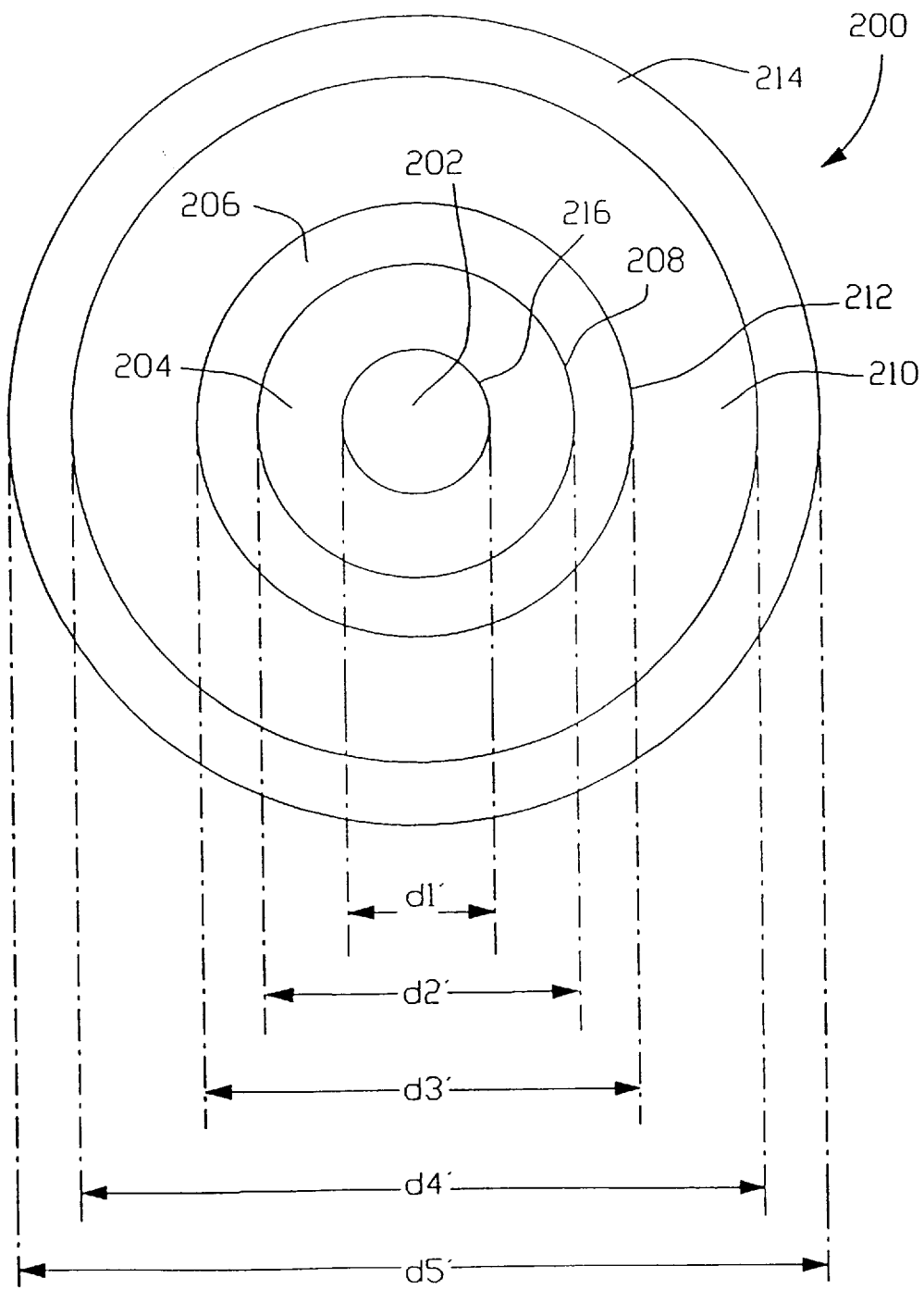
FIG. 3 is a schematic front elevational view, on an enlarged scale, of a multifocal contact lens.

As depicted in FIG. 3, a multifocal contact lens 200 customized for a patient has an anterior side with a power curve defined in part by a central surface 202, an inner annular surface 204 contiguous with central surface 202, a second annular surface 206 contiguous along a radially inner periphery 208 with inner annular surface 204, and an outer annular surface 210 contiguous along a radially inner periphery 212 with second annular surface 206. Each of the annular surfaces 204 and 210 is concentric or coaxial with central surface 202. Central surface 202 corresponds to a distant vision correction zone, while inner annular surface 204 corresponds to an intermediate vision correction zone, second annular surface 206 corresponds to a near distance correction zone and outer annular surface 210 corresponds to another distant vision correction zone.

Central surface 202 has a diameter d1' between approximately 1.5 mm and approximately 2.5 mm, while inner annular surface 204 has an outer diameter d2' between approximately 2.0 mm and approximately 3.5 mm. Second annular surface 206 has an outer diameter d3' between approximately 2.3 mm and approximately 4.5 mm, and outer annular surface 210 has an outer diameter d4' between approximately 3.5 and approximately 8.0 mm. An annular lenticular area 214 of lens 200 has no power curve and has an outer diameter d5' between approximately 8.0 mm and approximately 14.5 mm. Central surface 202 has a standard eccentricity between approximately −0.6 and approximately −1.0 and more preferably between about −0.75 and about −0.85.

Each power surface 202, 204, 208 and 210 may be either aspheric or spheric. In one specific embodiment, central surface 202 and inner annular surface 204 are both aspheric surfaces, with inner annular surface 204 corresponding to a progressive add zone having a standard eccentricity between approximately −1.5 and approximately −5.0 and, more preferably between approximately −3.0 and approximately −5.0. In this embodiment, annular surfaces 206 and 210 may be spheric or aspheric.

In a particular geometrical configuration of this specific corneal contact lens, diameters d1' through d5' are approximately 2.2 mm, approximately 2.8 mm, approximately 3.5 mm, approximately 8.0 mm, and approximately 14.5 mm, respectively. Central surface 202 has an eccentricity of approximately −0.8, while inner annular surface 204 has a standard eccentricity of approximately −5.0.

Where central surface 202 is aspheric, it preferably has a maximum change in power of approximately 1 diopter from the center radially outwardly to its peripheral edge 216. Where inner annular surface 204 is an aspheric progressive-add zone, it preferably has a maximum change in refractive power of approximately three and one-half diopters as measured radially from edge 216 to periphery 208.

Multifocal contact lens 200 has a spheric or aspheric cornea-fitting posterior surface (not designated), with an eccentricity magnitude ranging between (and including) 0.0 and about 1.5.

Multifocal contact lens 200 may be manufactured from hydrophilic or soft (hydrogel) polymeric materials i.e., polymeric materials which contain at least about 10% by weight water after hydration, such as disclosed in U.S. Pat. Nos. 5,314,960 and 5,314,961, the disclosures of which are incorporated by reference.

Central surface 202 corrects distance vision particularly under conditions of high illumination, while outer annular surface 210 corrects distance vision particularly under conditions of low illumination such as night driving. Surface 204 corrects vision for intermediate distances.

Lens 200 is fitted using a diagnostic or test lens with the same posterior surface as lens 200 and an anterior side with a central spheric or aspheric surface of a predetermined standard eccentricity and power and at least one annular spheric or aspheric surface of a predetermined standard eccentricity and power. Power curves for central surface 202 and outer annular surface 210 are determined, during a first over-refraction procedure wherein a diagnostic or test lens is placed on the cornea of the patient's eye. A power curve for second annular surface 206 is determined during a second over-refraction procedure. The power curves for central surface 202 and outer annular surface 210 may be determined under high illumination and low illumination levels, respectively. The power curve for paracentral or progressive-add surface 204 is determined by the preselected standard eccentricity of that intermediate zone and by the results of the first (distant vision) over-refraction procedure. Any progressive add zone (eccentricity of high magnitude) will provide a continuous range of powers to the retina and the brain of the patient. The patient's visual cortex selects from among that continuous range of powers or adds to obtain a focused sight.

It is to be noted that in some circumstances, the outer two annular surfaces or correction zones 206 and 210 may be omitted in a prescription lens. Such a simplified lens has only a central aspheric surface 202 and an annular progressive add surface or zone. The central aspheric surface has a diameter between about 1.5 mm and about 2.8 mm, while the annular progressive add zone has an outer diameter between about 1.5 mm and about 8.0 mm. The progressive add zone has a standard eccentricity having a magnitude between approximately 1.5 and approximately 5.0. Where the central aspheric surface corresponds to a distance vision correction zone, the annular surface is an aspheric surface corresponding to a progressive add zone with a standard eccentricity between approximately −1.5 and approximately −5.0.

In another modification of the contact lens of FIG. 3, only the outer annular zone 210 is omitted.

In another specific embodiment of the multifocal contact lens of FIG. 3, central surface 202 is aspheric while inner annular surface 204 is spheric instead of aspheric. In this embodiment, the inner annular surface still corresponds to an intermediate vision correction zone. The radius of curvature of spheric surface 204 is determined by an over-refraction procedure during a diagnostic evaluation as described in detail elsewhere herein.

In yet another specific embodiment of the multifocal contact lens of FIG. 3, all of the power curves are spheric, i.e., surfaces 202, 204, 206 and 210 are spheric surfaces with radii of curvature determined by over-refraction procedure during a diagnostic evaluation. In this alternative multifocal contact lens, the surfaces 202, 204, 206 and 210 still correspond to distance, intermediate, near, and distance vision corrections zones, respectively. The widths of the surfaces, in the radial direction, are as set forth above with reference to FIG. 3.

In an alternative lens having the general geometrical configuration described above with respect to FIG. 3, the central surface corresponds to an aspheric near vision correction zone with a standard eccentricity between approximately +1.5 and approximately +5.0 and preferably between approximately +3.0 and approximately +3.5, whereas the inner annular surface is aspheric with a standard eccentricity between approximately +1.5 and approximately +3.5 and preferably about +2.5. The second annular correction surface is also aspheric and has a standard eccentricity between approximately +0.3 and approximately +1.0 and preferably approximately 0.8. In such a lens, the central aspheric correction zone has a diameter between about 1.1 mm and about 2.2 mm, while the inner annular surface has an outer diameter between about 1.1 mm and about 2.5 mm. The second annular surface has an outer diameter between about 2.0 mm and 8.0 mm. Usually, a lens with a central near vision correction zone will have only three vision correction zones, although a fourth zone may be appropriate in some cases.

An eccentricity between 0.0 and about 1.5 for cornea-fitting posterior surface 14 of a diagnostic hydrophilic lens or a finished prescription lens is in accordance with the generally aspheric topographical characteristics of the human cornea. With such an eccentricity, cornea-fitting posterior surface 14 is fitted relatively tightly to the patient's eye, so that the lens, which may move slightly with eye and eyelid movement, does not move significantly with movement of the upper eyelid.

As mentioned above, the patient is fitted with a prescription lens 110, 122, 200 (generally, from a lens production laboratory) which is substantially identical to a diagnostic lens. The prescription lens may have two anterior aspheric surfaces (FIG. 1 or 3) or three (or more) anterior aspheric surfaces. The anterior surface of the selected lens blank is machined or, more specifically, lathed to produce the appropriate anterior surfaces 126, 128, 130 (FIG. 2) or 202, 204, 206, 210 (FIG. 3). Alternatively, either the posterior or anterior surface of the lens or the entire lens, including posterior and anterior surfaces, may be molded.

In most cases, over-refraction of a diagnostic lens will provide adequate vision for near, intermediate and far distances. In such a case, a lens having a posterior surface with a single spheric or aspheric curve 14 may be used with good success. In certain instances, it may be advantageous to provide a second aspheric surface (not shown) on the periphery of the cornea-fitting posterior surface 14, each of the aspheric posterior surfaces ranging in eccentricity from about 0.0 to about 1.5.

Generally, as is well known in the art, if the anterior power curve is decreased by 12 lines for each diopter, the add is 1.0. A decrease of 6 lines for each ½ diopter results in an add of 0.5, while a decrease of 24 lines for each 2 diopters results in an add of 2.0. Similarly, a decrease of 48 lines for each 4 diopters results in an add of 4.0. This rule of thumb is helping in guiding the practitioner to design a lens which can accommodate varying powers of the lens in predetermined distances for maximum fit and visual effectiveness.

Figure 4:
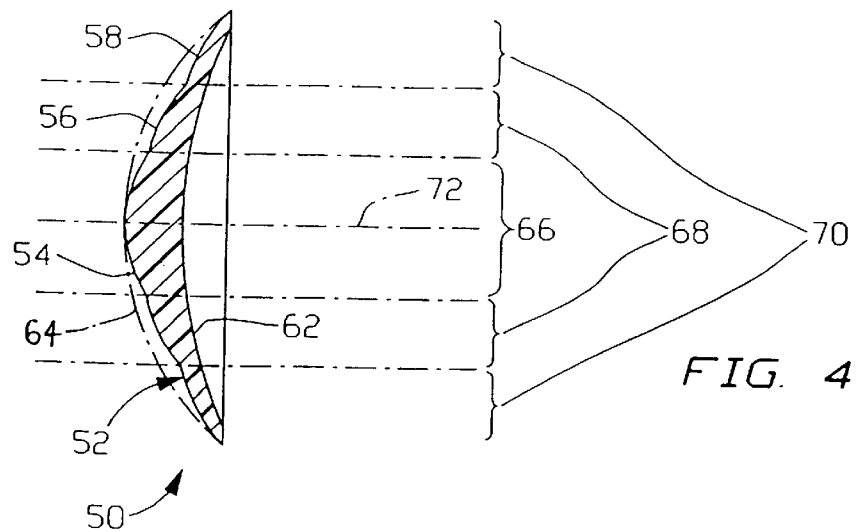
FIG. 4 is a schematic cross-sectional view of a multifocal contact lens.

FIG. 4 shows a special multifocal hydrophilic contact lens 50 with an optional enhanced intermediate vision correction. As illustrated in FIG. 4, a multifocal hydrophilic contact lens 50 has an anterior surface or side 52 with three concentric or coaxial aspheric surfaces 54, 56, and 58 each formed with a respective power curve having a standard eccentricity value between about 0.4 and about 2.5. The eccentricity values differ from one another by at least about 0.2 and by no more than about 0.8. Lens 50 has a concave cornea-fitting posterior surface 62 which includes at least one aspheric surface having an eccentricity value between about 0.0 and about 1.5.

Hydrophilic multifocal soft lens 50 may include one or more spheric or aspheric posterior surfaces, but preferably, lens 50 has one aspheric surface 62 ranging in eccentricity from about 0.0 to about 1.5. In certain embodiments of a contact lens, the posterior cornea-fitting surface of the contact lens may have two annular aspheric surfaces, each of which has an eccentricity value ranging from about 0.0 and about 1.5.

Central aspheric surface or power curve 54 provides distance vision and has an eccentricity value with a smaller magnitude than the magnitude of the eccentricity value of para-central aspheric surface or power curve 56 which provides intermediate vision. The eccentricity of para-central aspheric surface or power curve 56 in turn has a magnitude which is smaller than the magnitude of the eccentricity of peripheral aspheric surface or power curve 58, which provides a correction for near vision. Preferably, the eccentricity value of central aspheric power curve 54 is between about −0.4 and about −0.8, the eccentricity value of para-central aspheric surface or power curve 56 is between about −0.6 and about −0.8, and the eccentricity value of peripheral aspheric surface or power curve 58 is between about −0.8 and about −1.2.

Aspheric surfaces or power curves 54, 56 and 58 are determined in a fitting method utilizing a diagnostic lens having the same posterior surface 62 as lens 50 and an anterior surface 64 having a predetermined standard refractive power. That refractive power is for distance vision. Alternatively, the diagnostic lens may have a plurality of concentric or coaxial areas with respective predetermined standard refractive powers, e.g., for distance vision and near vision, respectively. The diagnostic lens is selected from a kit of diagnostic lenses with different posterior surfaces 62 and different overall dimensions. The diagnostic lens is selected to conform to the particular shape and dimensions of a patient's cornea. The over-refraction diagnostic or fitting procedure described hereinabove is described in detail in U.S. Pat. Nos. 5,526,071, 5,493,350, and 5,404,183, the disclosures of which are hereby incorporated by reference.

Anterior aspheric surfaces or power curves 54, 56, and 58 are located in a central correction zone 66, an intermediate annular correction zone 68, and a peripheral annular correction zone 70, respectively. Aspheric surfaces or power curves 54, 56, and 58 are concentric or coaxial with a lens axis 72. It is to be noted that the eccentricity values of surfaces or power curves 54, 56, and 58 differ from one another by no more than about 0.8 in order to provide a smooth transition from one correction zone 66, 68, or 70 to another.

A hydrophilic multifocal contact lens as depicted in FIG. 4 may have only a central correction zone 66 and a peripheral correction zone 70 with associated aspheric surfaces or power curves 54 and 58 for correcting distance vision and near vision, respectively. Alternatively, four aspheric surfaces or power curves may be provided, all ranging in eccentricity from about 0.4 to about 1.8, preferably from about 0.6 to about 1.0, each of the aspheric surfaces differing in eccentricity value within the range of about 0.2 to about 0.8.

It is to be noted that the change in eccentricity from aspheric surface or power curve 54 to aspheric surface or power curve 56, as well as the change in eccentricity from aspheric surface or power curve 56 to aspheric surface or power curve 58, should be gradual, to reduce stress on the eye.

As depicted in FIG. 5, a multifocal contact lens pair customized for a patient includes a first corneal contact lens 300 and a second corneal contact lens 400. Lenses 300 and 400 provide substantially identical viewing in both the distance and near ranges. However, the lenses have different optimal viewing distances in the intermediate range.

Lens 300 has an anterior side with a power curve defined in part by a central surface 302, an inner annular surface 304 contiguous along a radially inner periphery 305 with central surface 302, a second annular surface 306 contiguous along a radially inner periphery 308 with inner annular surface 304, and an outer annular surface 310 contiguous along a radially inner periphery 312 with second annular surface 306. Each of the annular surfaces 304 and 310 is concentric or coaxial with central surface 302. Central surface 302 corresponds to a distant vision correction zone, while inner annular surface 304 corresponds to a intermediate vision correction zone, second annular surface 306 corresponds to a near distance correction zone and outer annular surface 310 corresponds to another distant vision correction zone.

Similarly, lens 400 has an anterior side with a power curve defined in part by a central surface 402, an inner annular surface 404 contiguous along a radially inner periphery 405 with central surface 402, a second annular surface 406 contiguous along a radially inner periphery 408 with inner annular surface 404, and an outer annular surface 410 contiguous along a radially inner periphery 412 with second annular surface 406. Each of the annular surfaces 404 and 410 is concentric or coaxial with central surface 402. Central surface 402 corresponds to a distant vision correction zone, while inner annular surface 404 corresponds to an intermediate vision correction zone, second annular surface 406 corresponds to a near distance correction zone and outer annular surface 410 corresponds to another distant vision correction zone.

Inner annular surface 304 of lens 300 has an optical power for providing optimal viewing in a more distant portion of the intermediate range, while inner annular surface 404 of lens 400 has an optical power for providing optimal viewing in a closer portion of the intermediate range. The inner annular surface 304 of the one lens 300 is designed to provide a vision correction in a television viewing range, whereas the inner annular surface 404 of the second corneal contact lens 400 provides a vision correction in a computer screen viewing range. More specifically, inner annular surface 304 of lens 300 provides an optimal vision correction for objects disposed at a distance from the patient between approximately 6 feet and approximately 12 feet, and inner annular surface 404 of lens 400 provides an optimal vision correction for objects disposed at a distance from the patient between approximately 2 feet and approximately 5 feet. Accordingly, it is to be understood that inner annular surface 304 and inner annular surface 404 have substantially different optical powers. The difference in power us at least about 0.5 diopter and may be as great as 1.0 diopter.

Each vision-correcting or power surface 302, 304, 306, 310 and 402, 404, 406, 410 is characterized by a single uniform standard eccentricity. For any one power surface, the eccentricity may be zero, in which case the surface is spherical. One or more surfaces 302, 304, 306, 310 and 402, 404, 406, 410 may be clearly an intentionally aspherical, i.e., have a uniform standard eccentricity substantially or markedly different from zero (e.g., with a magnitude greater than approximately 0.6). For example, central surfaces 302 and 402 may each have a standard eccentricity between approximately −0.6 and approximately −1.0, or, more preferably, between about −0.75 and about −0.85.

Vision-correcting or power surfaces 302, 304, 306, 310 and 402, 404, 406, 410 have dimensions as discussed above with respect to lens 200 (FIG. 3). Accordingly, central surfaces 302 and 304 have diameters d1' between approximately 1.5 mm and approximately 2.5 mm, while inner annular surfaces 304 and 404 have an outer diameter d2' between approximately 2.0 mm and approximately 3.5 mm. Second or middle annular surfaces 306 and 406 have an outer diameter d3' between approximately 2.3 mm and approximately 4.5 mm, and outer annular surfaces 310 and 410 have an outer diameter d4' between approximately 3.5 and approximately 8.0 mm. Annular lenticular areas 314 and 414 of lenses 300 and 400 have no power curve and have an outer diameter d5' between approximately 8.0 mm and approximately 14.5 mm. For example, central surfaces 302 and 402 may each have standard eccentricity between approximately −0.6 and approximately −1.0 and more preferably between about −0.75 and about −0.85.

Generally, first lens 300 is provided for the patient's dominant eye, while lens 400 is fitted to the patient's nondominant eye. A first example of a contact lens pair 300, 400 is set forth in Table I below.

TABLE I

| Correction Zone | Dominant Eye | Nondominant Eye |
| --- | --- | --- |
| Center, Distance | −3.00 | −3.00 |
| Intermediate | −1.75 | −1.00 |
| Near | −0.50 | −0.50 |
| Outer, Distance | −3.00 | −3.00 |

In a particular geometrical configuration of this specific corneal contact lens, diameters d1' through d5' are approximately 2.2 mm, approximately 2.8 mm, approximately 3.5 mm, approximately 8.0 mm, and approximately 14.5 mm, respectively. Central surface 302 and inner annular surface 304 may be spherical or aspherical with eccentricities of approximately −0.8 and approximately −5.0, respectively.

Two further examples of contact lens pair 300, 400 are provided in tables II and III, below.

TABLE II

| Correction Zone | Dominant Eye | Nondominant Eye |
| --- | --- | --- |
| Center, Distance | −4.00 | −4.00 |
| Intermediate | −2.75 | −2.00 |
| Near | −1.50 | −1.50 |
| Outer, Distance | −4.00 | −4.00 |

TABLE III

| Correction Zone | Dominant Eye | Nondominant Eye |
| --- | --- | --- |
| Center, Distance | −4.00 | −4.00 |
| Intermediate | −3.00 | −2.25 |
| Near | −1.75 | −1.75 |
| Outer, Distance | −4.00 | −4.00 |

The dimensions of the different zones or surfaces 302, 304, 306, 310 and 402, 404, 406, 410 are those set forth above with reference to the first example.

Multifocal contact lenses 300 and 400 each have a spheric or aspheric cornea-fitting posterior surface (not designated), with an eccentricity magnitude ranging between (and including) 0.0 and about 1.5.

Multifocal contact lenses 300 and 400 may be manufactured from hydrophilic or soft (hydrogel) polymeric materials i.e., polymeric materials which contain at least about 10% by weight water after hydration, such as disclosed in U.S. Pat. Nos. 5,314,960 and 5,314,961, the disclosures of which are incorporated by reference.

Central surfaces 302 and 402 correct distance vision particularly under conditions of high illumination, while outer annular surfaces 310 and 410 correct distance vision particularly under conditions of low illumination such as night driving.

Lenses 300 and 400 may be fitted using diagnostic or test lenses with the same posterior surfaces as lenses 300 and 400, respectively, and anterior sides with central spheric or aspheric surfaces of predetermined standard eccentricities and powers. Each diagnostic lens has at least one annular spheric or aspheric surface of a predetermined standard eccentricity and power. Power curves for central surfaces 302 and 402 and outer annular surfaces 310 and 410 are determined, during a first over-refraction procedure wherein diagnostic or test lenses are placed on the patient's corneas. Power curves for middle annular surfaces 306 and 406 are determined during a second over-refraction procedure. The power curves for central surfaces 302 and 402 and outer annular surfaces 310 and 410 may be determined under high illumination and low illumination levels, respectively. The power curves for paracentral intermediate vision correction surfaces 304 and 404 may be determined by separate long and short intermediate distance over-refraction procedures. Alternatively, the power curve for paracentral intermediate vision correction surface 304 is determined by a preselected standard eccentricity of that intermediate zone and by the results of the distant vision over-refraction procedure for surface 302, while the power curve for paracentral intermediate vision correction surface 404 is determined by a preselected standard eccentricity of that intermediate zone and by the results of the near vision over-refraction procedure for surface 406. Again, the over-refraction diagnostic or fitting procedure is described in detail in U.S. Pat. Nos. 5,526,071, 5,493,350, and 5,404,183, the disclosures of which are incorporated by reference herein.

It is to be noted that in some circumstances, at least the outer annular surfaces 310 and 410 may be omitted in a prescription lens pair 300 and 400.

An eccentricity between 0.0 and about 1.5 for the cornea-fitting posterior surfaces of lenses 300 and 400 is in accordance with the generally aspheric topographical characteristics of the human cornea. With such an eccentricity, cornea-fitting posterior surface 14 is fitted relatively tightly to the patient's eye, so that the lens, which may move slightly with eye and eyelid movement, does not move significantly with movement of the upper eyelid.

Again, the patient is fitted with prescription lenses 300 and 400 (generally, from a lens production laboratory) which are substantially identical to respective diagnostic lenses. The anterior surfaces of the selected lens blanks are machined or, more specifically, lathed to produce the appropriate anterior surfaces 302, 304, 306, 310 and 402, 404, 406, 410. Alternatively, either the posterior or anterior surfaces of the lenses 300 and 400 or the entire lens, including posterior and anterior surfaces, may be molded.

Contact lenses 300 and 400 provide a kind of modified monovision wherein essentially perfect distance viewing is available for both eyes. Reading vision is also good. The intermediate viewing range is divided into a long zone and a short zone each of which is in focus for one eye only.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are offered by way of example to facilitate comprehension of the invention and should not be construed to limit the scope thereof.

What is claimed is:

1. A pair of multifocal contact lenses customized for a patient, comprising a first corneal contact lens and a second corneal contact lens each having an anterior side with a power curve defined in part by:

(i) a central surface, (ii) an inner annular surface contiguous with said central surface, (iii) a second annular surface contiguous along a radially inner periphery with said inner annular surface, and (iv) an outer annular surface contiguous along a radially inner periphery with said second annular surface, each of the annular surfaces being concentric or coaxial with said central surface, said central surface corresponding to a distance vision correction zone, said second annular surface corresponding to a near vision correction zone, and said outer annular surface corresponding to a distant vision correction zone;

wherein the inner annular surface of said first corneal contact lens corresponds to a long intermediate vision correction zone and the inner annular surface of said second corneal contact lens corresponds to a short intermediate vision correction zone, the inner annular surface of said first corneal contact lens and the inner annular surface of said second corneal contact lens having substantially different optical powers.

2. The pair of multifocal contact lenses defined in claim 1 wherein the inner annular surface of said first corneal contact lens provides a vision correction in a television viewing range, the inner annular surface of said second corneal contact lens providing a vision correction in a computer screen viewing range.

3. The pair of multifocal contact lenses defined in claim 1 wherein the inner annular surface of said first corneal contact lens provides an optimal vision correction for objects disposed at a distance from the patient between approximately 6 feet and approximately 12 feet, the inner annular surface of said second corneal contact lens providing an optimal vision correction for objects disposed at a distance from the patient between approximately 2 feet and approximately 5 feet.

4. The pair of multifocal contact lenses defined in claim 1 wherein said central surface and each of the annular surfaces has a respective uniform standard eccentricity.

5. The pair of multifocal contact lenses defined in claim 4 wherein said central surface and each of the annular surfaces has an eccentricity of zero.

6. The pair of multifocal contact lenses defined in claim 4 wherein at least one of said central surface and the annular surfaces is clearly an aspheric surface and has an eccentricity substantially different from zero.

7. The pair of multifocal contact lenses defined in claim 1 wherein said first corneal contact lens is provided for a dominant eye of the patient and said second corneal contact lens is provided for a non-dominant eye of the patient.

8. The pair of multifocal contact lenses defined in claim 1 wherein the optical powers of the inner annular surfaces of said first corneal contact lens and said second corneal contact lens differ in magnitude by more than approximately 0.5 diopters.

9. A pair of multifocal contact lenses customized for a patient, comprising:

a first corneal contact lens having an anterior side with a power curve defined in part by (i) a first central surface, (ii) a first inner annular surface contiguous with said first central surface, (iii) a first middle annular surface contiguous along a radially inner periphery with said first inner annular surface, and (iv) a first outer annular surface contiguous along a radially inner periphery with said first middle annular surface, each of the annular surfaces being concentric or coaxial with said first central surface, said first central surface corresponding to a distance vision correction zone, said first inner annular surface corresponding to an intermediate vision correction zone, said first middle annular surface corresponding to a near vision correction zone, and said first outer annular surface corresponding to a distant vision correction zone;

a second corneal contact lens having an anterior side with a power curve defined in part by (i) a second central surface, (ii) a second inner annular surface contiguous with said second central surface, (iii) a second middle annular surface contiguous along a radially inner periphery with said second inner annular surface, and (iv) a second outer annular surface contiguous along a radially inner periphery with said second middle annular surface, each of the annular surfaces being concentric or coaxial with said second central surface, said second central surface corresponding to a distance vision correction zone, said second inner annular surface corresponding to an intermediate vision correction zone, said second middle annular surface corresponding to a near vision correction zone, and said second outer annular surface corresponding to a distant vision correction zone;

wherein said first inner annular surface has an optical power for providing a vision correction in a television viewing range, said second inner annular surface having an optical power for providing a vision correction in a computer screen viewing range; and wherein said first and said second central surface and each of the annular surfaces has a respective uniform standard eccentricity.

10. The pair of multifocal contact lenses defined in claim 9 wherein said first inner annular surface provides an optimal vision correction for objects disposed at a distance from the patient between approximately 6 feet and approximately 12 feet, said second inner annular surface providing an optimal vision correction for objects disposed at a distance from the patient between approximately 2 feet and approximately 5 feet.

11. The pair of multifocal contact lenses defined in claim 9 wherein said first and said second central surface and each of said annular surfaces has an eccentricity of zero.

12. The pair of multifocal contact lenses defined in claim 9 wherein at least one of said first and said second central surface and said annular surfaces is clearly an aspheric surface and has an eccentricity substantially different from zero.

13. The pair of multifocal contact lenses defined in claim 9 wherein said first corneal contact lens is provided for a dominant eye of the patient and said second corneal contact lens is provided for a non-dominant eye of the patient.

14. The pair of multifocal contact lenses defined in claim 9 wherein the optical powers of said first and said second inner annular surface differ in magnitude by more than approximately 0.5 diopters.

15. A pair of multifocal contact lenses customized for a patient, comprising a first corneal contact lens and a second corneal contact lens each having an anterior side with a power curve defined in part by:

(i) a central surface, (ii) an inner annular surface contiguous with said central surface, and (iii) a second annular surface contiguous along a radially inner periphery with said inner annular surface, each of the annular surfaces being concentric or coaxial with said central surface, said central surface corresponding to a distance vision correction zone, and said second annular surface corresponding to a near vision correction zone;

wherein the inner annular surface of said first corneal contact lens corresponds to a long intermediate vision correction zone and the inner annular surface of said second corneal contact lens corresponds to a short intermediate vision correction zone, the inner annular surface of said first corneal contact lens and the inner annular surface of said second corneal contact lens having substantially different optical powers.

16. The pair of multifocal contact lenses defined in claim 15 wherein the inner annular surface of said first corneal contact lens provides a vision correction in a television viewing range, the inner annular surface of said second corneal contact lens providing a vision correction in a computer screen viewing range.

17. The pair of multifocal contact lenses defined in claim 15 wherein the inner annular surface of said first corneal contact lens provides an optimal vision correction for objects disposed at a distance from the patient between approximately 6 feet and approximately 12 feet, the inner annular surface of said second corneal contact lens providing an optimal vision correction for objects disposed at a distance from the patient between approximately 2 feet and approximately 5 feet.

18. The pair of multifocal contact lenses defined in claim 15 wherein said central surface and each of the annular surfaces has a respective uniform standard eccentricity.

19. The pair of multifocal contact lenses defined in claim 15 wherein said first corneal contact lens is provided for a dominant eye of the patient and said second corneal contact lens is provided for a non-dominant eye of the patient.

20. The pair of multifocal contact lenses defined in claim 15 wherein the optical powers of the inner annular surfaces of said first corneal contact lens and said second corneal contact lens differ in magnitude by more than approximately 0.5 diopters.

* * * * *